Figure 1:
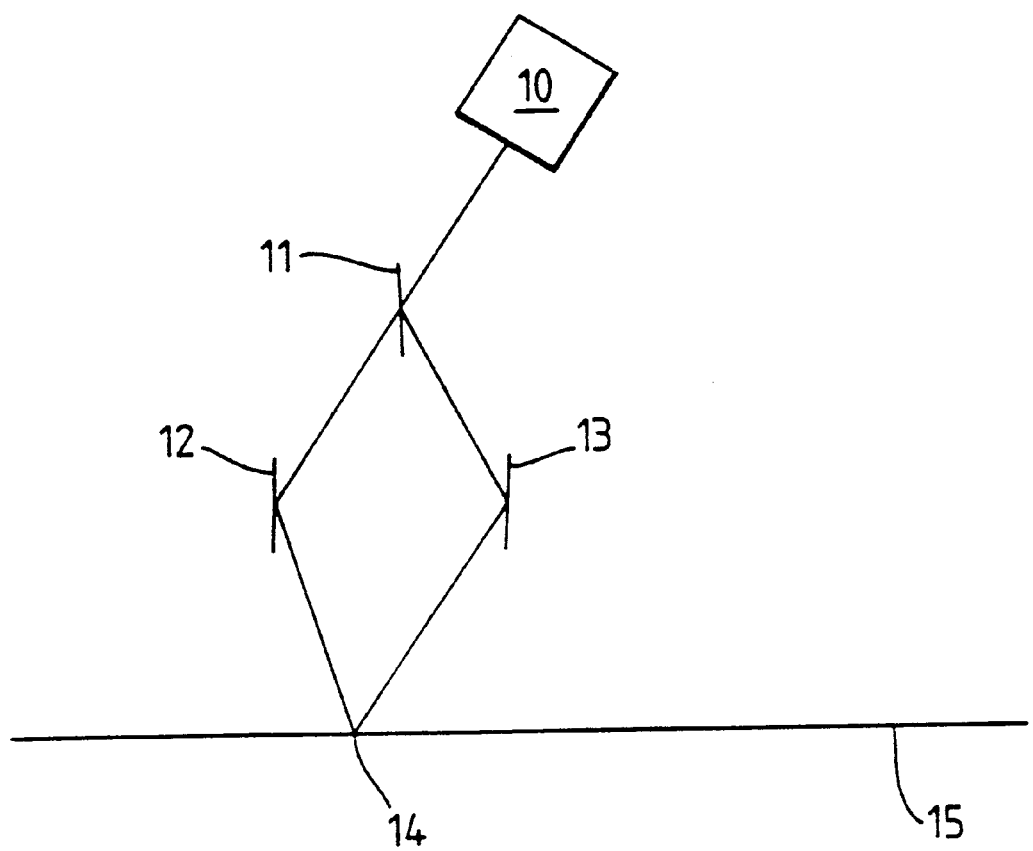

United States Patent [19]
Ainslie et al.

[11] Patent Number: 6,075,625
[45] Date of Patent: Jun. 13, 2000

[54] PHOTOINDUCED GRATING IN $B_2O_3$ CONTAINING GLASS

[75] Inventors: Benjamin J Ainslie, Ipswich; Douglas L Williams, Grundisburgh; Graeme D Maxwell, Ipswich; Raman Kashyap, Ipswich; Jonathan R Armitage, Ipswich, all of United Kingdom

[73] Assignee: British Telecommunications public limited company, London, United Kingdom

[21] Appl. No.: 08/302,931
[22] PCT Filed: Jun. 24, 1993
[86] PCT No.: PCT/GB93/01321
  § 371 Date: Sep. 22, 1994
  § 102(e) Date: Sep. 22, 1994
[87] PCT Pub. No.: WO94/00784
  PCT Pub. Date: Jan. 6, 1994

[30] Foreign Application Priority Data

Jun. 24, 1992 [EP] European Pat. Off. .............. 92305783

[51] Int. Cl.$^7$ ................ G03H 1/00; G02B 6/34
[52] U.S. Cl. ................ 359/3; 359/34; 359/900; 385/37
[58] Field of Search ............ 359/3, 7, 34, 900; 385/14, 37

[56] References Cited

U.S. PATENT DOCUMENTS

| | | |
|---|---|---|
| 4,618,211 | 10/1986 | Fleury . |
| 4,740,951 | 4/1988 | Lizet et al. ................ 385/37 |
| 5,210,801 | 5/1993 | Fournier et al. ................ 385/14 |

FOREIGN PATENT DOCUMENTS

| | | |
|---|---|---|
| 2 017 331 | 10/1979 | United Kingdom . |
| WO 86/01303 | 2/1986 | WIPO . |
| WO 90/08973 | 8/1990 | WIPO . |

OTHER PUBLICATIONS

*Electronics Letters*, vol. 29, No. 1, Jan. 7, 1993, pp. 45–47, Williams et al, "Enhanced UV Photosensitivity in Boron Codoped Germanosilicate Fibres".

SPIE, vo. 1516, International Workshop on Photoinduced Self–Organization Effects in Optical Fiber (1991), "Bragg Grating Formation and Germanosilicate Fiber Photosensitivity", G. Meltz et al, pp. 185–199.

*Patent Abstracts of Japan*, Publ. No. JP55040477, Mar. 21, 1980, Production of Diffraction Grating, Abstract.

*Electronics Letters*, vol. 27, No. 21, Oct. 10, 1991, Stevenage, Herts., G.B., pp. 1945–1947, "Formation of Moire Grating in Core of Germanosilicate Fibre By Transverse Holographic Double Exposure Method".

Database WPIL, Week 8739, 1987, Derwent Publications Ltd, & JP A 62 189 407 (Agency of Ind. Sci., Tech.), Aug. 19, 1987, Light Waveguide Manufacture Heat Treat Polish Glass Coating Silicon Baseplate Thermal Oxidation Film.

Soviet Inventions Illustrated, Section Ch. Week 8309, Apr. 13, 1983.

*Primary Examiner*—Cassandra Spyrou
*Assistant Examiner*—John Juba, Jr.
*Attorney, Agent, or Firm*—Nixon & Vanderhye P.C.

[57] ABSTRACT

It has been demonstrated that B containing glasses are sensitive to radiation in the band 225–275 nm and, therefore, $B_2O_3$ glasses are particularly adapted to receive refractive index modulation, e.g., to make reflection gratings. Glasses containing $SiO_2$ and $B_2O_3$ are particularly suitable when the grating is to be localized in the cladding of a fiber. Glasses containing $SiO_2$, $GeO_2$, and $B_2O_3$ are suitable when the grating is in the path region of a waveguide, e.g., in the core of a fiber.

11 Claims, 1 Drawing Sheet

PHOTOINDUCED GRATING IN $B_2O_3$ CONTAINING GLASS

This invention relates to optical devices which include refractive index modulation, e.g. reflection gratings.

Reflection gratings are often implemented as waveguides which have a path region and/or a confining region with a modulated refracted index. The waveguiding structure is often in the form of a fibre. The modulation preferably takes the form of alternate regions of higher and lower refractive index. When radiation traverses the modulation, it is selectively reflected. The period of the refractive index modulation is usually equal to the wavelength to be reflected or to a multiple or sub-multiple of said wavelength. Thus periods in the range 250 to 600 nm preferentially reflect selected wavelengths within the range 800–1650 nm.

Reflection gratings have many applications in optical signalling. For example, a reflection grating can be associated with a fibre laser in order to narrow the lasing bandwidth. When the refractive index bands are not perpendicular to the fibre axis, the grating can be used for the selective removal of unwanted wavelengths. In addition to reflection gratings, refractive index modulation has other applications, e.g. to achieve phase matching in waveguides, to control spot size and/or shape in waveguides and for storing information.

Refractive index modulation is conveniently produced by an optical process in which a photosensitive glass is exposed to radiation which causes an adequate change in its refractive index. The radiation has higher and lower intensities corresponding to the intended pattern of modulation of the refractive index of the glass. In many commonly used embodiments, the mutual interference of two beams of radiation produces the variation of intensity appropriate for reflection gratings. In the case of information storage, the pattern of radiation relates to the data to be stored.

Silica/germania glasses are widely used in optical telecommunications and it has been noticed that these glasses have an optical absorption band extending approximately over the wavelength range 225–275 nm and exposure to radiation within this band increases the refractive index of the silica/germania composition. The peak of the band occurs at a wavelength which is close to 240 nm. It has, therefore, been proposed to produce refractive index modulation, e.g. to make reflection gratings, by exposing silica/germania glass compositions to radiation within the wavelength band 225–275 nm. Radiation close to 240 nm is particularly suitable. High powers of radiation, e.g. above 1 mW continuous, are needed to produce adequate changes in the refractive index and writing times of a few minutes to a few hours are appropriate.

WO86/01303 describes the writing of phase gratings in optical fibres or waveguides by the application of intense beams of ultraviolet light. It is stated that the grating is produced in the core of a wave guide and that the core is preferably a germanium-doped silica or glass filament.

The sensitivity of the glass is important, and this invention is based upon the unexpected discovery that glasses which contain $B_2O_3$ are particularly sensitive to radiation, e.g. radiation close to 240 nm, and that these glasses are well adapted to carry the necessary refractive index modulation. Preferably the glass contains at least one of $SiO_2$ and $GeO_2$ as well as the $B_2O_3$.

Compositions consisting essentially of $GeO_2$ and $B_2O_3$ preferably containing at least 2 mole % of each component, are suitable for thin film optical devices which are capable of storing data in the form of refractive index modulation.

Compositions consisting essentially of $SiO_2$ and $B_2O_3$, preferably containing at least 2 mole % of each component, are particularly suitable for carrying the refractive index modulation wherein said modulation constitutes a reflection waveguide located in the confining region of an optical waveguide. Glass consisting essentially of $SiO_2$ and $GeO_2$ would be particularly suitable for use as the path region of said waveguide.

Compositions (herein after called ternary compositions) consisting essentially of $SiO_2$, $GeO_2$ and $B_2O_3$ are particularly suitable for use in optical devices according the invention. Preferred ternary compositions contain:

2–40 mole % of $B_2O_3$,
2–40 mole % of $GeO_2$, and
at least 30 Mole % of $SiO_2$.

It should be noted that $B_2O_3$ tends to decrease the refractive index of a silica glass whereas $GeO_2$ tends to increase the refractive index of a silica glass.

Since the concentration of $B_2O_3$ affects the refractive index as stated above, the refractive index will display a maxima at minima $B_2O_3$ concentration and the refractive index will display a minima at maximum $B_2O_3$ concentration. It is standard practice in the preparation of optical waveguides to vary the concentration of a dopant radially through the core region, e.g., to fabricate a graded index multimode fibre. However, it is less convenient (and even impractical) to produce fine detail longitudinal variation, e.g., a reflection grating, by varying the concentrations of relevant components.

It has been noticed that some glasses are photo-sensitive whereby exposure to suitable light causes changes in the refractive index and exposure to fine patterns is adapted to produce the desired fine detail. It is doubtful that the optical exposure changes the chemical composition of the glass and it is more appropriate to postulate that structural changes, possibly including defect centers, play a substantial role in the overall effect. Even though the mechanism is not fully understood, the production of refractive index patterns by exposure to radiation has been demonstrated experimentally.

It has already been stated that glasses which contain $B_2O_3$ are particularly sensitive to radiation and, as indicated above, the refractive index patterns produced in accordance with the invention are independent of the boron content of the glass. Conveniently the mole ratios B:Si and B:Ge are constant in the region where the refractive index modulation is applied. In most applications it is appropriate for both ratios to be constant, e.g., the glass has a uniform composition. (Where one of the elements silicon or germanium is absent it is convenient to take the relevant ratio as 1:0.)

Ternary compositions as defined above have great potential for adjusting the important properties of the glass as required. The refractive index is one of the important properties because it is usually of major importance to match the refractive indices of the device according to the invention to the refractive index of adjacent optical components. The device according to the invention is often required to perform a waveguiding function and proper adjustment of the refractive indices of the confining region and the path region are necessary to get good waveguiding properties. In particular it is important to adjust the refractive index difference between the path region and the confining region to a predetermined value. This difference is usually called Δn.

It is possible to adjust the ratio of $B_2O_3$: $GeO_2$ so that the decrease in refractive index caused by the $B_2O_3$ is balanced (approximately or exactly) by the increase caused by the $GeO_2$. Thus the ternary compositions with $B_2O_3$ in excess of the amount needed to balance the $GeO_2$ will have refractive indices lower than that of pure silica whereas ternary compositions with an excess of $GeO_2$ will have refractive indices greater than that of pure silica. The ternary compositions can be used in either the confining region, or the path region or in both.

The terms "confining region" and "path region" are used to designate the regions of lower and higher refractive index respectively. It will be appreciated that, especially in the case of single mode waveguides, substantial portions of energy will be transferred in that part of the confining region which is close to the path region. Thus the energy in the confining region will interact with a reflection grating located in the confining region whereby gratings in the confining region can be used either alone or to enhance the effect of gratings in the path region.

It will be appreciated that the waveguiding structures mentioned above may be either planar waveguiding structures or fibres, especially single mode fibres. In the case of a fibre the confining region corresponds to the cladding and the path region corresponds to the core.

In addition to the essential ingredients as specified above the glasses used to make optical devices according to the invention may contain conventional additives, e.g. melting point depressants to facilitate processing during the manufacture of the articles. Melting point depressants for silica glasses include phosphorus, usually present as an oxide, and fluorine.

The preparation of optical devices according to the invention usually includes the preparation of the glasses by the oxidation of the appropriate chlorides using $O_2$ at high temperature as the oxidizing agent. If desired, the glass intended to carry the refracted index modulation may be subjected to mild reduction, e.g. by heating in the absence of oxygen. This is conveniently achieved by heating the glass in the presence of helium.

The refractive index modulation is applied to the glass which contains $B_2O_3$ by exposing said glass to the appropriate pattern of radiation which accesses the absorption band having a peak close to 240 nm. Radiation having wavelengths within the band 225–275 nm, e.g. a wavelength which is close to 2450 nm, is particularly suitable. Radiation which has double these wavelengths is also effective.

Two reflection gratings according to the invention will now be described by way of example. The gratings are located in the core of a fibre based on silica glasses and the preparation of the fibre will be described first. The exposure of the fibre to radiation in order to produce the refractive index modulation will also be described with reference to accompanying drawing.

The fibre was prepared by a modification of the well-known inside deposition process for making optical fibre. In this process, the appropriate number of layers are deposited on the inner surface of a tube which serves as a substrate. Thus the outermost layers are deposited first and the innermost layers are deposited last. After all the layers have been deposited, the tube is collapsed into a solid rod, and the solid rod is drawn into .

Individual layers are produced by passing a mixture of oxygen and $SiCl_4$ with reagents such as $B_2Cl_3$ and $GeCl_4$ through the tube and heating a small section thereof to temperatures in the range 1200° C.–2000° C. Under these conditions the chlorides are converted into the corresponding oxides which initially deposit on the wall of the tube in the form of a fine "soot" which is immediately fused to give a consolidated glass.

As an alternative the deposition is carried out at a temperature such that the deposit remains n a porous state and, at a later stage in the process, the "soot" is fused at a higher temperature to give the consolidated glass. This alternative is appropriate when it is desired to submit the deposit to chemical treatments wherein the porous state facilitates the desired reaction, e.g. reduction. Melting point depressants such as phosphorus and fluorine may be incorporated in the mixture to facilitate processing by causing fusing at lower temperatures.

The heating is carried out by causing a flame to traverse along the length of the tube. The flame heats a short section of the tube so that a portion, about 20 mm long, is heated to the working temperature. This technique of heating is used for all stages of the process, i.e. for the deposition, for consolidating porous layers to solid layers and for the collapse of the tube. Multiple passes are used at all stages of the process.

The starting tube was made of pure silica. It had an external diameter of 18 mm and an internal diameter of 15 mm.

Cladding Deposition

The deposited cladding took the form of $SiO_2$ with phosphorus and fluorine to reduce its melting point. Six layers of cladding were deposited, and the conditions used for the deposition of each layer were as follows:

| | |
|---|---|
| Oxygen | 2 liters/min |
| Helium | 1.5 liters/min |
| $SiCl_4$ | 0.45 liters/min |
| $POCl_3$ | 0.1 liters/min |
| $CCl_2F_2$ | 0.0005 liters/min |

In the case of $SiCl_2$ and $POCl_3$ the flow rates specify the rate of flow of $O_2$ through a bubbler thermostated at 24° C. The working temperature was approximately 1525° C. It is emphasised, that after each traverse, each cladding layer was in the form of a clear glassy layer before the next layer was deposited.

The cladding layers could be considered to be part of the substrate tube upon which the core layers were deposited. The deposition of cladding layers as described above could be omitted. The main purpose of the cladding layers is to reduce the risk of contamination from the original tube affecting core layers.

Core Deposition

Core was deposited in two layers and the conditions for the deposition of each of the two layers were as follows:

| | |
|---|---|
| Oxygen | 2.0 liters/min |
| $BCl_3$ | 0.03 liters/min |
| $SiCl_4$ | 0.1 liters/min |
| $GeCl_4$ | 0.2 liters/min |

In the case of $SiCl_4$ and the $GeCl_4$ the flow rates specify the rate of flow of $O_2$ through a bubbler thermostated at 24° C. In the case of $BCl_3$ the flow rate is that of the vapour itself at 300° and 1 atmosphere.

The working temperature was only 1450° C. but this consolidated the core layers.

After the preparation described above, the tube was collapsed into a solid rod in the conventional manner using five traverses of the flame.

The solid rod, i.e., the preform for , had a core which contained approximately 57 mole % $SiO_2$, 25 mole % $B_2O_3$ and 18 mole % $GeO_2$ giving an RI of 1.462. The cladding, essentially $SiO_2$, had an RI of 1.458 so that Δn=0.004. The composition of the glass in the core was substantially uniform, i.e., the mole ratio B:Si was 1:2.28 throughout and the mole ratio B:Ge was 1:0.72 throughout.

The procedure described above, apart from the use of $BCl_3$ in the core, constitutes an essentially conventional preparation of a preform.

The preform prepared as described above was drawn into of 120 μm diameter at a temperature of 2,000° C. The was produced at a rate of 18 meters/min. This is the precursor of reflection gratings according to the invention.

Short lengths of the described above were converted into reflection waveguides using the technique illustrated in the drawing. In each short length of the core had a uniform composition, i.e., as specified for its preform. Before exposure as described below the refractive index of the core was uniform.

A short portion 14 of the 15 was illuminated by a source 10. This radiation was, in the first instance, produced by an $Ar^+$ laser, frequency doubled to give output at a wavelength of 244 nm. The beam from the source 10 was directed onto a splitter 11 so that two beams were directed onto mirrors 12 and 13. The mirrors 12 and 13 caused the beams to converge onto the target section, 14. Thus an interference pattern is produced with alternating regions of higher and lower intensity. Because the 15 is photosensitive, the region 14 (whereon the beams are focused) is affected by the beams and the refractive index is increased in the areas of high intensity. Thus a reflection grating is produced in the region 14.

It will be appreciated that the spacing of the interference pattern is affected by the angle at which the two beams intersect one another, and hence the spacing of the grating can be adjusted by adjusting the relative position of the splitter 11 and the mirrors 12 and 13.

Two specimens of this were subjected, to an interference pattern to produce reflection gratings A and B. For comparison, a reflection grating was prepared from a conventional , i.e. without the boron. This comparative grating is identified as grating X. Important measurements on these gratings and their waveguides are given in the following table.

|  | GRATING A | GRATING B | GRATING X |
|---|---|---|---|
| Length | 2 mm | 1 mm | 2 mm |
| RI Core | 1.462 | 1.462 | 1.463 |
| Δn | .004 | .004 | .005 |
| Index Modulation | $1 \times 10^{-3}$ | $7 \times 10^{-4}$ | $3.4 \times 10^{-5}$ |
| Grating Reflectivity | 99.5% | 67% | 1.2% |
| RIC | 25% | 15% | 0.68% |
| Input Energy | 60J | 48J | 192J |

The "RIC" is the relative index change and it is calculated as [(index modulation)/Δn)]×100 (to convert to percentage).

(In optical technology, refractive index matching of components is often important to avoid unwanted reflections from component interfaces. Thus reflection gratings need to be refractive index-matched to adjacent components and this limits the freedom to adjust the composition to maximise the photo sensitivity and the grating properties. It is usually easier to obtain index modulation in which has high Δn and the RIC takes this circumstance into account).

The properties of grating X can be compared directly with grating A because both gratings are 2 mm long. The most important property of the grating is reflectivity and in this key parameter grating A is very much better than grating X (99.5% as against 1.2%). It will be appreciated that the length of a grating has a strong effect upon its reflectivity and the longer a grating (other things being equal) the better its reflectivity. It is, therefore, important that both grating A and X have the same length.

Grating B has only half the length but its reflectivity is still 67% which is considerably better than grating X even though grating X is longer. The index modulations of gratings A and B are similar ($10 \times 10^{-4}$ as compared with $7 \times 10^{-4}$). Grating X has a much lower modulation ($0.34 \times 10^{-4}$) which is a clear indication that the boron, containing the glasses are more photo sensitive. Grating X has a slightly higher Δn (0.005 against 0.004) so the RIC values emphasise the superiority of the gratings according to the invention.

What is claimed is:

1. An optical device comprising a portion formed of a glass which contains at least one of $SiO_2$ and $GeO_2$ said portion including a region in which the refractive index has been spacially modulated to provide a pattern of refractive index variation, characterised in that said pattern is applied to a glass which contains $B_2O_3$ and said pattern is not dependent on the boron content of the glass.

2. An optical device according to claim 1, wherein the pattern constitutes a reflection grating which takes the form of alternate regions of higher and lower refractive index whereby said modulation is adapted for use as a reflection grating.

3. An optical device according to claim 2, wherein the period of said refractive index pattern is within the range 0.25 to 0.6 μm whereby said modulation selectively reflects radiation within the wavelength band 800–1650 nm.

4. An optical device according to claim 2, wherein said pattern is located in a confining region of a waveguide.

5. An optical device according to claim 4, wherein said confining region is formed of a silica glass doped with $B_2O_3$ and a path region of said waveguide is formed of a silica glass doped with $GeO_2$.

6. An optical device according to claim 4, wherein the waveguide is in the form of a .

7. An optical device according to claim 6, wherein the is single mode at the signal wavelength.

8. An optical device according to claim 2, wherein said pattern is located in a path region of a waveguide.

9. An optical device according to claim 8, wherein a confining region of said waveguide is formed of a silica glass and said path region is formed of a silica glass doped with $B_2O_3$ and $GeO_3$.

10. An optical device according to claim 1 wherein said glass contains at least 2 mol. % of $B_2O_3$.

11. A method of producing a reflection grating in an optical waveguide having a glass core and a glass cladding, wherein the reflection grating comprises a pattern of alternate higher and lower refractive indices, said pattern being located in a portion of said cladding, said portion being formed of a glass containing silica doped with $B_2O_3$, which method comprises exposing said portion to a modulated pattern of radiation, said modulation comprising higher and lower intensities corresponding to the pattern of said reflection grating; said radiation having a wavelength within the band 225–275 nm.

* * * * *